United States Patent [19]

Breider

[11] 4,442,005
[45] Apr. 10, 1984

[54] METHOD OF AND APPARATUS FOR THE BIOLOGICAL DECONTAMINATION OF WASTE WATER

[75] Inventor: Edmund J. Breider, Getzville, N.Y.

[73] Assignee: Linde Aktiengesellschaft, Höllriegelskreuth, Fed. Rep. of Germany

[21] Appl. No.: 367,990

[22] Filed: Apr. 13, 1982

[30] Foreign Application Priority Data

Apr. 14, 1981 [DE] Fed. Rep. of Germany ....... 3115104

[51] Int. Cl.³ .............................................. C02F 3/26
[52] U.S. Cl. .................................. 210/614; 210/96.1; 210/625; 210/627; 210/739
[58] Field of Search ............... 210/604, 614, 613, 625, 210/626, 627, 195.3, 201, 96.1, 739

[56] References Cited

U.S. PATENT DOCUMENTS

| 1,254,841 | 1/1918 | Noble | 210/625 |
| 2,477,815 | 8/1949 | Mallory | 210/625 |
| 3,047,492 | 7/1962 | Gambrel | 210/625 |
| 4,130,481 | 12/1978 | Chase et al. | 210/625 |

FOREIGN PATENT DOCUMENTS 54-115562 9/1979 Japan .................................. 210/614

Primary Examiner—Benoit Castel
Attorney, Agent, or Firm—Karl F. Ross; Herbert Dubno

[57] ABSTRACT

A substantially constant loading waste water treatment process and apparatus subjects the waste water to treatment with recycled sludge and oxygen in an activation basin. The suspension is separated into sludge and effluent and a portion of the recycled sludge, when the waste loading exceeds a threshold value, is aerated before being introduced into the activation basin in a separate aerating basin.

6 Claims, 2 Drawing Figures

METHOD OF AND APPARATUS FOR THE BIOLOGICAL DECONTAMINATION OF WASTE WATER

FIELD OF THE INVENTION

My present invention relates to a waste or water sewage treatment method and apparatus and, more particularly, to a method of and an apparatus for the biological decontamination of waste water, especially municipal sewage.

BACKGROUD OF THE INVENTION

It is known to treat waste water in a basin in the presence of activated sludge with gasification with an oxygen-containing gas, to separate waste water from the activated sludge mixture in a separator or clarifier (afterclarifier) downstream of the activation wasted, and to recycle at least part of the sludge as recycled sludge to the activation basin from the clarifier.

Such a process is described, for example, in the LINDE Report, *Linde-Berichte aus Technik und Wissenschaft*, No. 34, 1973, pp 37–40. In this system, the activation basin is completely sealed from the atmosphere or is partly sealed therefrom and is aerated with a gas containing a higher concentration of oxygen than atmospheric air.

The oxygen which does not go into solution is collected and selected, e.g. via a blower. The aerating gas is replenished with oxygen from a source thereof to compensate for the oxygen which is solubilized. The experience with this method has shown that in spite of the use of an oxygen-containing gas and, indeed, a gas containing more oxygen than is present in ambient air, anaerobic conditions can develop in the effluent with an effect on the microorganisms, their environment and the character of the material exchange which results in a reduction in the rate of substrate decomposition.

For high and effective substrate decompositions in the activation vessel, it is important that the activated sludge induces practically complete decomposition of the incoming organic waste when this activated sludge comes into contact with the waste water upon recirculation.

When, however, circumstances develop which tend to transform the desired aerobic conditions to anaerobic conditions and thus tend to reduce the rate at which decomposition occurs, the activated sludge does not have the activating capacity upon recycling which it would normally be expected to have and thus complete decomposition of the substrate residues may not occur.

This, of course, limits the sludge loading which can be sustained in the activation vessel.

Put otherwise, the organic loading, i.e. the rate at which substrate is introduced into a biological treatment process to which activated sludge is recycled in an aerated activation basin may exceed, under circumstances of a shift from aerobic to anaerobic conditions, the capacity of the recycled activated sludge to fully decompose the added substrate.

DESCRIPTION OF PRIOR ART

The following references in a search in Class 210 were discovered:

U.S. Pat. Ser. No. 3,994,802 (CASEY et al)

This patent describes an activated sludge treatment system for both carbonaceous and nitrogeneous removal. In this invention, the waste water is subjected to successive oxic, anoxic and oxic treatment zones. In some embodiments, mixed liquor is recycled from a downstream oxic zone to an upstream anoxic zone; while in other embodiments, the return sludge is divided and fed to the first oxic and downstream anoxic treatment zones. The purpose of the mixed liquor recycle is to ensure that there is sufficient nitrite and nitrate for the organisms in the anoxic treatment zone (col. 8, lines 34–40); while the purpose of the stepwise sludge recycle is to ensure an adequate supply of BOD for the organisms in the anoxic treatment zone (col. 8, lines 40–48).

OBJECTS OF THE INVENTION

It is the principal object of the present invention to provide a waste water treatment process of the activated sludge type whereby disadvantages of earlier systems are avoided and, in general, the process is carried out more economically and efficiently than heretofore.

Another object of this invention is to provide a method decontaminating sewage by the activated sludge process which allows simple and economical operation of the activation basin or basins with the highest possible sludge loading, permits the highest possible efficiency in energy utilization, and ensures a high exploitation of the aerating gas.

Still another object of this invention is to provide an improved apparatus for carrying out the method of this invention.

SUMMARY OF THE INVENTION

These objects and others which will become apparent hereinafter are attained, in accordance with the present invention, in a method as described wherein, upon an increase of the organic (waste) loading of the influent above a predetermined value, a portion of the recycled sludge is introduced into an aeration basin and is aerated with oxygen-enriched air or gas until the organic loading of the influent drops below the predetermined value, whereupon it is introduced into the activation basin.

With the method of the present invention, the waste water treatment is effected as in a conventional activated sludge method when the organic loading of the influent waste water lies below a predetermined level, i.e. the waste water is contacted with activated sludge in the activation basin and is aerated therein, the sludge waste water mixture is withdrawn from the activation basin and fed to a separator or clarifier, sludge is separated from the effluent in the clarifier and activated sludge is recycled from the separator or clarifier to the activation basin.

With variation of the organic loading of the influent waste water and with high organic loading in the activation basin, an activated sludge is fed to the latter with a higher organic decomposition potential or capacity than is ordinarily the case, this increased decomposition capacity being brought about by aerating the sludge in an aerating vessel as described before the recycled sludge is delivered to the activation basin. This ensures maintenance of a high sludge loading in the activation basin, economical energy utilization and high utilization for the aerating gases since only a portion of the recycled sludge is fed to the aeration basin upon the aforementioned increase in the organic loading of the influent waste water and thus only a limited quantity of gas is required to bring about a sharp increase in the decomposition capacity of the recycled sludge. The aeration of this portion of the recycled sludge does not occur continuously and, indeed, generally is effected only for limited periods of time as may be required.

The limited duration over which the sludge aeration occurs precludes aerobic sludge stabilization which can lead to a high activity loss in the activated sludge with reduction in the oxygen takeup capacity.

If the maximum waste loading of the influent is reached or the waste loading then drops in accordance with a preferred embodiment of the invention, the rate at which the recirculated sludge is fed to the aeration basin before it is delivered to the activation basin is accordingly reduced and, with an appropriate delay, a portion of the influent is introduced into the aeration basin in dependence upon the sludge concentration therein.

The supply of a portion of the influent to the aeration basin thus serves to enable the activated sludge formed therein to be washed into the activation basin.

The reference to an activation basin or to an aeration basin should be understood to include reference to a plurality of such basins of corresponding functions, operating in parallel or in series.

Thus the method of the invention can include all of the usual steps in the activated sludge process, namely, screening of large objects or materials from the waste water or sewage, sealing of sedimentable materials such as sand therefrom, secondary screening of smaller objects, if desired, and contacting the biodegradable waste water containing organic components and forming the aforementioned influent with activated sludge in one or more activation basins in which aeration is carried out with a gas containing a greater concentration of oxygen than ambient air.

The water/sludge suspension is then passed to an afterclarifier or separator in which the sludge is separated from the effluent.

A portion of this active sludge is recirculated to the activation basin or basins.

The principal feature of the present invention resides in the interposition of an aeration basin which is distinct from the activation basin or basins and which intercepts at least a portion of the recirculated activated sludge upon the waste loading in the influent exceeding a certain threshold, this intercepure portion of the sludge being aerated in the gasification basin before it is permitted to pass into the activation basin or basins.

Of course, all of the activated sludge which is recirculated can be subjected to aeration and, in general, the aeration of recycled active sludge in the aeration basin is effected in dependence upon the sludge concentration.

Excellent results are obtained in the system of the present invention when the predetermined or threshold level of waste loading of the influent has a value between 1.3 to 1.6 kg $BOD_5$ per day per kg of suspended volatile solids.

Advantageously, the aeration of the recirculated sludge or the aforementioned portion of the recirculated sludge is effective with an oxygen enriched air, i.e. air to which several volume per set of additional oxygen is added.

The apparatus for carrying out the present invention thus comprises an aeration basin in addition to the usual activation basin or basins, clarifier or clarifiers, and recycling system, the aeration basin being in the recycling path and provided with means for delivering the aerated sludge to the activation basins and with means flushing with the influent.

The aeration basin, of course, is provided with means for incorporating oxygen or air into the sludge and the necessary control means including pumps and the like for bypassing the recycled sludge into an aeration basin, for discharging the aerated sludge thereafter and, when the organic loading of the influent is less than the threshold value, simply shunting the recycled sludge past this aeration basin.

Naturally, the aeration basin does not have to be a separate unit spaced from the activation basin set aside exclusively for aeration of the sludge or a portion thereof.

It has also been found to be advantageous to provide the aeration basin with a branch line from the influent pipe, this branch line having a valve connected to the control system.

According to the invention, the control system includes means for determining the organic waste loading in the influent and for determining the sludge concentration in the aeration basin, the latter means controlling the valve while the former means can control the treatment of the active sludge in the aeration basins.

In accordance with a further feature of the invention, the aeration device in the aeration basin is operated by the control means which monitors the organic waste loading of the influent so that the aeration basin and the aeration of the sludge therein is triggered upon an increase of the organic waste loading above the threshold value and it is cut out in response to the monitoring device for the sludge concentration in the aeration basin.

This apparatus thus permits over a brief but necessary period of time, all or a portion of the recycled sludge to be aerated upon an increase in the organic waste loading of the influent above the predetermined threshold. Apart from increasing the sludge loading which can be thus generated, an overall reduction in the oxygen consumption is found to result.

When oxygen enriched air is utilized for the aeration, both the activation and the aeration basins are preferably isolated from the atmosphere and supplied with gas through pipes, while pipes also serve to cover gases which emerge from the basins.

The invention can thus be considered to comprise:

(a) mixing an activated sludge, an oxygen-containing gas and a variable BOD-containing waste water in an aeration zone to form an aerated mixed liquor;

(b) separating the aerated mixed liquor in a separation zone into a purified effluent and the activated sludge;

(c) discharging the purified effluent and recycling the activated sludge to the aeration zone;

(d) aerating at least a portion of the recycled activated sludge in a separate aeration zone while the substrate loading rate of the variable BOD-containing waste water is increasing above some preselected value, said aerating being conducted without the addition of any significant fraction of the variable BOD-containing waste water;

(e) further aerating said portion of the activated sludge while the loading rate of the variable BOD-containing waste water begins to decrease, said further aeration continuing until the substrate loading rate essentially returns to the preselected value; and (f) passing the aerated recycled activated sludge of steps (d) and (e) to the aeration zone as part of the activated sludge.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
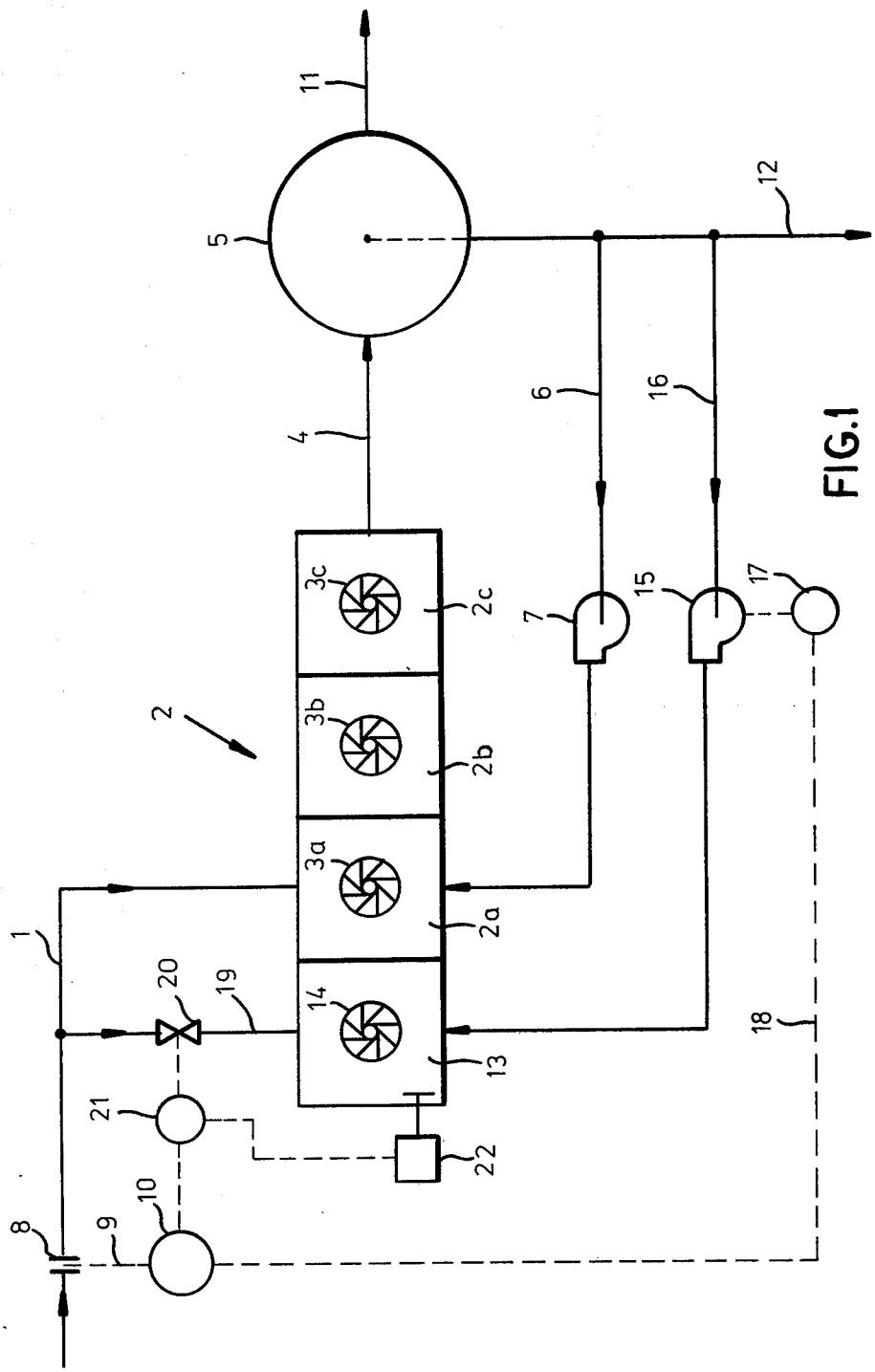
FIG. 1 is a flow diagram illustrating an apparatus for carrying out the method of this invention.

In FIG. 1 of the drawing I have shown a sewage treatment plant in which an activation basin 2 is supplied with the influent via line 1 and comprises three aeration zones 2a, 2b and 2c connected in series.

Each aeration zone is provided with a respective surface oxygenator 3a, 3b, 3c which induces direct contact between the waste suspension and oxygen of the oxygen enriched air delivered to the respective zone.

The suspension from the last zone 2c is carried by a duct 4 into a separator or clarifier 5 from which the effluent is decanted as represented by line 11' and sludge is removed.

A portion of this sludge is recycled via pipe 6 and pump 7 to the first aeration zone 2a.

The influent pipe 1, which can derive from any conventional screening or settling tank, is provided with a monitoring device 8 for measuring the organic waste loading of the influent. This unit can simply respond to the solids content and/or the flow rate since the waste loading is usually proportional to these parameters. The organic loading thus measured is applied as an actual value signal to the control unit represented diagrammatically at 10.

When the waste loading of the influent is below the aforementioned threshold value which may be approximately the average loading of the influent over a considerable period of time, say, a month or a year, the waste water is permitted to flow via pipe 1 into the zone 2a for processing in the usual manner with recycled sludge via line 6 and pump 7 and aeration in each of the three zones.

In other words, all of the waste water is delivered to the initial zone 2a where it is treated with activated sludge recycled from the clarifier 5 via line 6 and pump 7 with aeration utilizing the surface aerator 3a. After the usual residence time, the suspension passes into the second zone 2b where aeration is renewed and then finally enters the zone 2c which represents the final aeration stage.

The suspension then passes into the clarifier 5 and the decantate is removed at the decantage effluent 11, which can be further processed as is conventional or merely discharged while a portion of the sludge is recirculated via line 6 and the balance of the sludge is covered at 12 and also further processed, e.g. by composting, drying and incineration. The excess sludge is discharged at 12.

As long as the waste loading of the influent lies below the threshold, the system operates in this manner.

Should the waste loading of the influent exceed the threshold value, the controller 10 transmits a signal 18 to the pump operator 17 so that an additional portion of the sludge is recycled from the clarifier 5 via line 16 by the pump 15 to an aerating basin 13 provided with a surface aerator 14.

The branch line 19 from the influent pipe 1 has a valve 20. The latter is operated by a controller 21 connected to the control unit 10.

With the increase in either the flow rate of the influent or the solids content thereof so that the loading exceeds the threshold, the controller 10, in the manner described, triggers the operation of pump 15 to draw a portion of the sludge from the clarifier and deliver it to the basin 13 where it is intimately contacted with oxygen and then transferred into the first activation zone 2a of the activated sludge basin.

If maximal organic loading is reached, i.e. the loading of the influent drops, the control unit 10 transmits an output to the operator 17 to cut off the pump 15 so that further sludge quantities do not enter the basin 13. The basin 13 is provided with a monitoring unit 22 which determines the sludge concentration and can be, for example, a photoelectric sensor which responds to the turbidity.

With an appropriate delay after cut-off of the influx of further sludge and independence upon the sludge concentration, valve 20 is opened so that a portion of the waste water can flush the contents of the aeration basin into the first zone 2a.

The quantity of the influent which is utilized to flush the basin 13 is a function of the sludge concentration and a level of maximum organic loading of the waste water. If this is extremely high, a large volume of waste water is admitted with a correspondingly shorter delay.

When the sludge concentration in the aeration basin 13 falls below a predetermined value, the photosensitive detector 22 closes the valve 20 and the system operates in the below-threshold mode as previously described until the organic loading of the influent again exceeds the threshold value.

Advantageously, the aeration basin 13 and the activation basin 2 are closed against the atmosphere hermetically so that pure oxygen can be utilized for the action.

The supply of oxygen to the surface aerators 14, 3a, 3b and 3c can thus be effected by supplying pure oxygen or oxygen enriched air with oxygen concentrations and/or at rates depending upon the organic loading of the influent. The surface oxygenator 14 can be energized through the operator 17 which energizes the pump 15 and can be cut off when the valve 20 is closed. This reduces oxygen consumption and reserves energy.

In the system of the invention, the waste water is not fed to the aeration basin 13 as long as the organic loading of the influent continues to increase.

However, in some cases it has been found to be advantageous to admit some of the influent into the aeration basin even during an increase in the waste loading of the influent. This can be the case, for example, with extremely high organic loading.

Under these circumstances the controller 10 can generate a signal which directly opens the valve 20 and can admit a portion of the influent into the aeration basin 13. However, the amount of the influent waste water which is thus fed into the aeration basin 13, should not be more than a minor proportion of the waste water treated. If the amount of waste water delivered to the aeration basin 13 is significantly greater, difficulties can arise with maintaining a high sludge concentration in the aeration basin although the feed of some waste water into this basin has been found to increase the rate at which the sludge is brought to its increased capacity for handling the increased organic load.

It has already been indicated that high sludge loading can be sustained with reduced oxygen consumption when the aforementioned threshold of organic loading of the influent is between 1.3 and 1.6 kg $BOD_5$ per day per kg of volatile suspended solids VSS.

Figure 2:
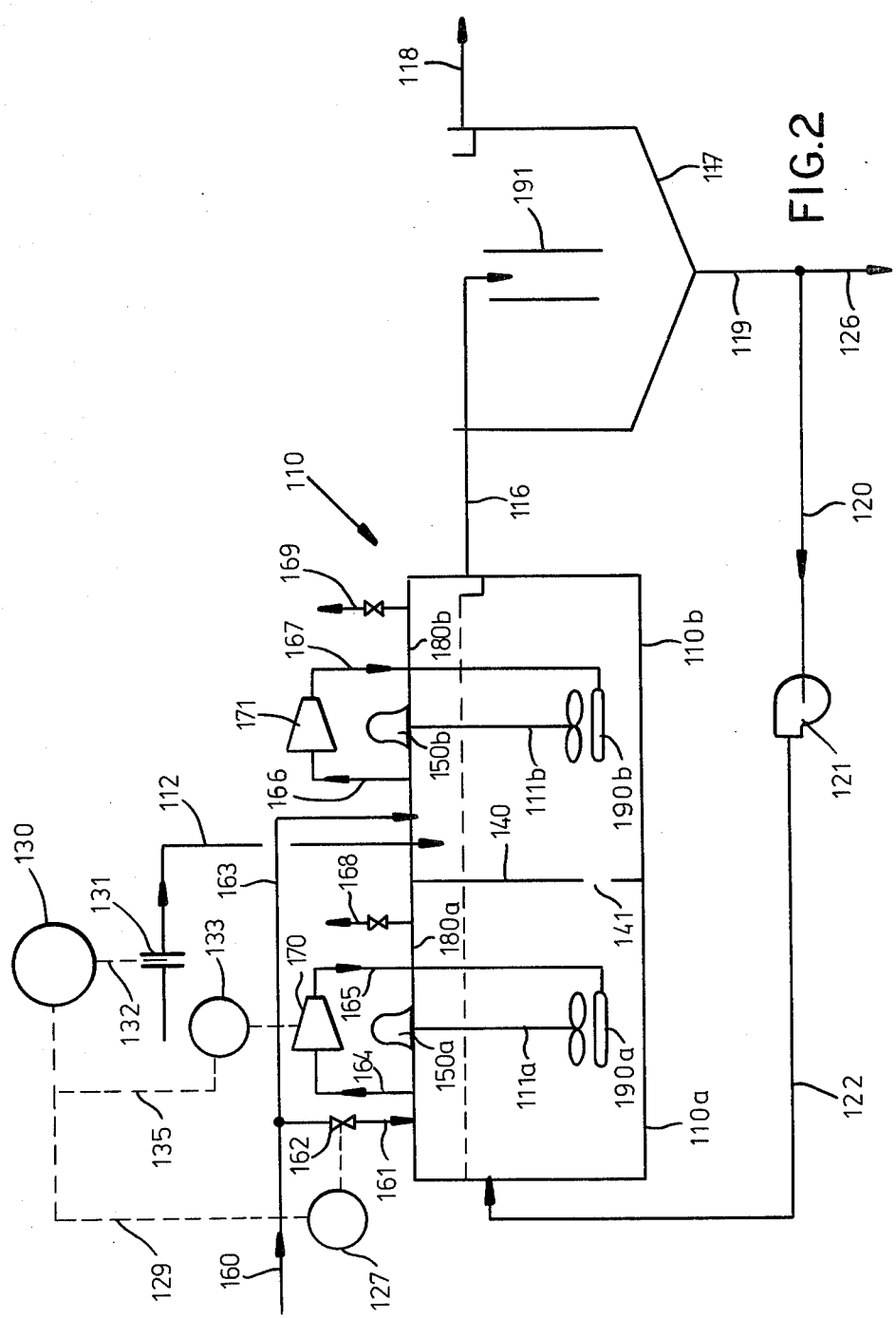
FIG. 2 illustrates another apparatus for this purpose in a diagrammatic side elevation.

In the plant of FIG. 2, the variable BOD-containing waste water stream in conduit 112 has its flow rate measured by the flowmeter orifice 131. A signal representative of the flow rate is transmitted to the flow recorder controller or FRC 130 through line 132.

FRC 130 in turn transmits a representative signal to controllers 127 and 133 through lines 129 and 135, respectively.

As long as the signal received and transmitted by FRC 130 indicates that the waste water flow is at or below the preselected volume flow rate, controller 127 maintains valve 162 closed and controller 133 maintains recirculating blower 170 off.

The BOD-containing waste water flows into aeration stage 110b of aeration basin 110 through conduit 112.

A source (not shown) of an enriched oxygen gas is provided and the oxygen gas is passed through conduits 160 and 163 into aeration stage 110b. Aeration stage 110b is provided with a gastight cover 180b to maintain an oxygen rich environment in the gas space. An activated sludge is also introduced into the aeration stage 110b through opening 141 in the wall 140. This activated sludge originates in the clarification vessel 117 from where it is transferred through conduits 119 and 120, pump 131 and conduit 122 into the separate aeration stage (zone) 110a.

The waste water, activated sludge and oxygen gas are intimately mixed in aeration stage 110b by mechanical agitation means 111b to form an aerated mixed liquor. The agitation means is driven by motor 150b, having a shaft passing through a seal in the gastight cover 180b. In this embodiment, the agitation means comprises an impeller positioned below the surface of the liquid in aeration stage 110b. Oxygenation gas from the gas phase is withdrawn through conduit 166 by blower 171 for compression and returns through conduit 167 to the submerged sparger or diffuser 190b positioned beneath agitator 111b. Spent oxygenation gas is discharged from aeration stage 110b through conduit 169 which may be provided with a flow control valve. While a specific method of aerating the contents of aeration stage 110b (as well as stage 110a described hereafter) has been described, one of normal skill will readily appreciate that other methods are possible and the present invention is not to be limited to any specific method of aeration.

After sufficient treatment in the aeration stage 110b, as fixed by the volume of the aeration stage, the aerated mixed liquor is discharged through conduit 116 to a central concrete baffle 191 within clarification vessel 117. A purified liquid is discharged through conduit 118, while an activated sludge is removed through conduit 119.

One portion of the sludge may be wasted through conduit 126 as required while the other major portion is returned to the separate aeration stage 110 through conduit 120, pump 121 and conduit 122.

Preferably, although not necssarily, the sludge in the separate aeration stage is kept mixed by motor 150a and agitation means 111a.

As long as the waste water flow rate measured by orifice 131 and FRC 130 remains at or below the preselected value, valve 162 remains closed and recirculating blower 170 remains inoperative, i.e. no aeration is provided in the separate aeration stage 110a. The separate aeration stage 110a, therefore, acts as an extension of the clarifier, maintaining an inventory of solids. Once the flow rate begins to increase above the preselected value, however, the improved process of this invention takes effect.

The initial increase in the waste water flow rate is measured by orifice 131 and a signal indicative of this change is transmitted to the FRC 130. FRC 130 in turn transmits an appropriate signal to controllers 127 and 133. Controller 127 then opens valve 162 and controller 133 turns on the recirculating blower or compressor 170. As a result, the sludge in aeration stage 110a is aerated. As long as the waste water flow measured by orifice 131 and FRC 130 remains above the preselected value, the sludge in the separate aeration stage 110 is aerated. Preferably, the rate of aeration, as determined by the recirculation rate of blower 170, is varied directly in response to the differential between the actual waste water flow and the preselected value. In other words, it is preferable to aerate the sludge in the separate aeration stage at an increasingly higher rate, as the substrate loading rate increases. Conversely, as the substrate loading decreases, the aeration rate should commensurately decrease.

Once the flow rate essentially decreases below the preselected value, a signal is transmitted along lines 129 and 135 to controllers 127 and 133, respectively, thereby closing valve 162 and terminating blower 170. Operation then returns to the steady state procedure outlined above.

SPECIFIC EXAMPLES

An activation basin having two activation zones, each with a volume of 1.5 $m^3$ form a waste water treatment stage. The sludge aeration basin also had a volume of 1.5 $m^3$ and the clarifier basin had a volume of 9.7 $m^3$.

For aeration, 99.5% oxygen was utilized and was introduced in each of the aerated basins by aeration turbines.

The daily feed of the waste water and the daily organic loading during the period of the example were as follows:

The municipal waste water flow rate fell between midnight and 5 a.m. uniformly from 47 to 34 l/min. From 5 a.m. onward, the flow rate increased and reached at 9 a.m. a value of 64 l/min. of sewage which corresponded to the average daily flow rate. At 11 a.m. it reached its maximum value of 123 l/min.

During the period between 9 a.m. and 11 a.m., a portion of the recirculated sludge, 7.5 l/min., was aerated in the sludge aeration basin and only thereafter delivered to the activation basins.

Between 11 a.m. and 17:00 hours (5 p.m.), the flow rate decreased uniformly to the average of 64 l/min. During this period, about 15 l/min. of the waste water was passed through the aeration basin to flush the latter, and the sludge concentration in the aeration basin slowly decreased. Between 5 p.m. and midnight the flow rate decreased from 65 l/min to 47 l/min and a new cycle thereafter began.

Each day measurements of the organic loading were taken at 8 a.m., 11 a.m. and 4 p.m. To simplify the procedure, the organic loading was deduced from a determination of the chemical oxygen demand which was found to be proportional substantially to the BSB$_5$ loading period.

The mean waste loading during the entire process was 3.9 kg COD per day VSS with a maximum daily variation of 3.5 kg in the waste loading and an average daily variation of 2.5 kg. VSS. During the entire process, the effluent was found to be satisfactorily decontaminated and the sludge quality was also high.

Three comparative tests were made utilizing the systems and parameters as described.

Test A corresponds to the conventional approach described in which sludge aeration only upon passage of the threshold in the special aeration basin of the invention was not utilized, the sludge recycle being at a passable rate.

Test B shows the results obtained when 7.5 l/min of recycled sludge was continuously aerated.

Test C shows the results when 3 l/min of sludge were continuously aerated.

The first column of Table 1, which displays the results represents the the invention in which, as described, the oxygenation of the sludge was only effected once the threshold loading was exceeded.

The table shows the maximum delay fluctuation, the main delay fluctuation and the main variation. The results displayed in the table clearly demonstrate that fluctuations are minimized and, as is important to the present invention, the system operates practically as a constant loading sewage treatment system.

TABLE 1

|  | Process of the Invention | Test A variable sludge recycle | Test B constant (7.5 l/min.) sludge recycled | Test C constant (3 l/min) sludge recycled |
| --- | --- | --- | --- | --- |
| maximal daily variation* | 3.5 | 11.3 | 6.1 | 11.5 |
| mean daily variation | 2.5 | 6.2 | 3.2 | 5.9 |
| mean variation | 3.9 | 3.7 | 2.8 | 4.0 |

*given in kg COD/day kg VSS

I claim:

1. A method of biologically treating an influent waste water having variable organic waste loading which comprises the steps of:
    (a) contacting said waste water with recycled sludge and aerating same in at least one activation basin to decompose organic components in said waste water and produce a suspension;
    (b) withdrawing said suspension and separating same into an effluent and sludge in at least one clarifier;
    (c) recycling at least a portion of the sludge separated in step (b) to the activation basin of step (a);
    (d) monitoring the waste loading of said waste water;
    (e) only upon the monitored waste loading said waste water exceeding a predetermined threshold, aerating at least a portion of the sludge recycled in step (c) prior to introduction of the recycled sludge into said activation basin in step (a) in an aeration basin which is not spatially separated from the activation basin; and
    (f) upon the monitored waste loading of said waste water reaching a maximum, introducing a portion of the influent waste water to said aeration basin to flush aerated sludge from said aeration basin into said activation basin.

2. The method defined in claim 1 wherein the rate at which recycled sludge is aerated in step (e) is controlled in dependence upon the sludge concentration.

3. The method defined in claim 1, or claim 2 wherein the threshold value corresponds to 1.3 to 1.6 kg BOD$_5$ per day per kg of suspended volatile solids.

4. The method defined in claim 3 wherein said sludge is aerated in step (e) with a gas containing a higher concentration of oxygen than ambient air.

5. A waste water treatment plant which comprises:
    (a) an activation basin provided with means for the passage of waste water therethrough and having at least one activation zone for contacting a waste water containing biologically degradable organic wastes with recycled sludge and oxygen;
    (b) an afterclarifier connected to said activation basin for receiving a suspension therefrom and separating said suspension into sludge and a decontaminated effluent;
    (c) means for recycling at least a portion of the sludge separated from said effluent in said clarifier to said activation basin;
    (d) an aerating basin connected to and forming a unit with said activation basin and provided with means for aerating sludge and delivering aerated sludge to said activation basin;
    (e) means effective upon the increase in waste loading of said waste water for feeding a portion of the sludge recycled from said clarifier to said aeration basin; said activation basin being provided with an influent pipe;
    (f) a branch pipe connected between said influent pipe and said aeration basin and provided with a valve for feeding a minor portion of influent waste water to said aeration basin;
    (g) control means responsive to the sludge concentration in said aeration basin for controlling said valve; and
    (h) means for monitoring the organic waste loading of said waste water, and control means responsive to said monitoring means for controlling the sludge fed to said aerating basin.

6. The plant defined in claim 5 wherein said basins are closed from the atmosphere and are fed with aerating gas containing a high concentration of oxygen than ambient air.

* * * * *